INVENTOR.
GEORGE P. NISSEN
BY
ATTORNEY

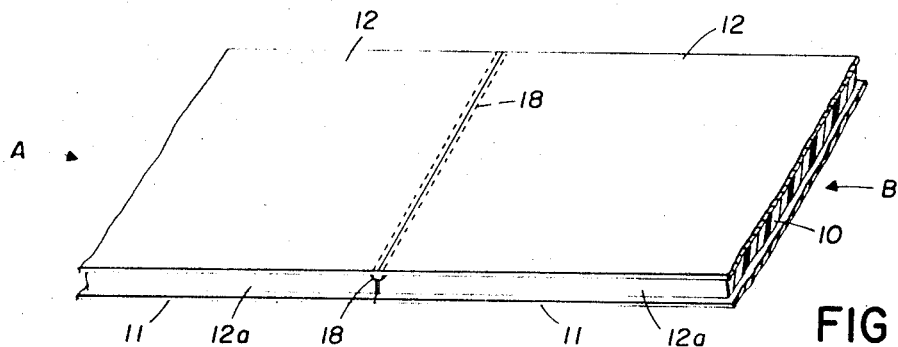
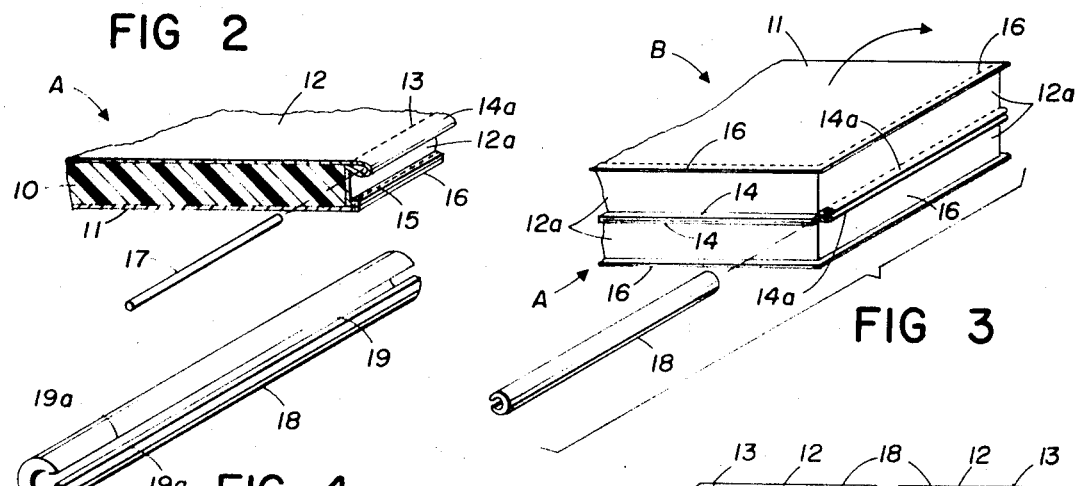
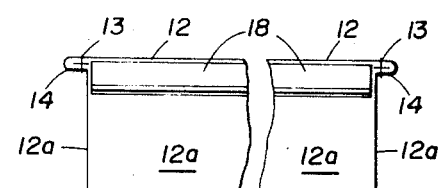
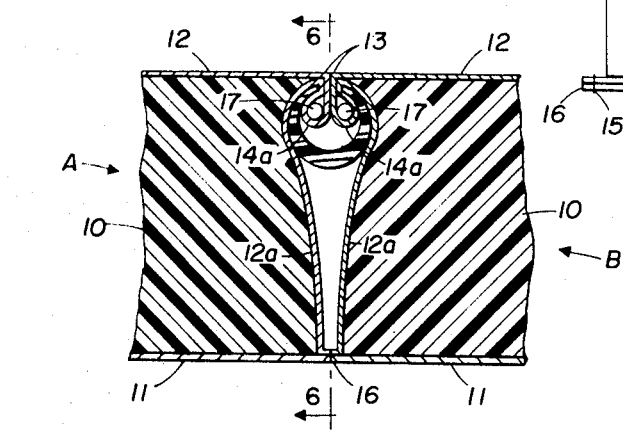
FIG 1
FIG 2
FIG 3
FIG 4
FIG 5
FIG 6
INVENTOR.
GEORGE P. NISSEN
BY
ATTORNEY

Dec. 7, 1971   G. P. NISSEN   3,624,848
CONNECTABLE FLOOR MATS FOR GYMNASTIC AND ATHLETIC PURPOSES
Filed Jan. 23, 1969   6 Sheets-Sheet 3

INVENTOR.
GEORGE P. NISSEN
BY
ATTORNEY

Dec. 7, 1971 G. P. NISSEN 3,624,848
CONNECTABLE FLOOR MATS FOR GYMNASTIC AND ATHLETIC PURPOSES
Filed Jan. 23, 1969 6 Sheets-Sheet 4
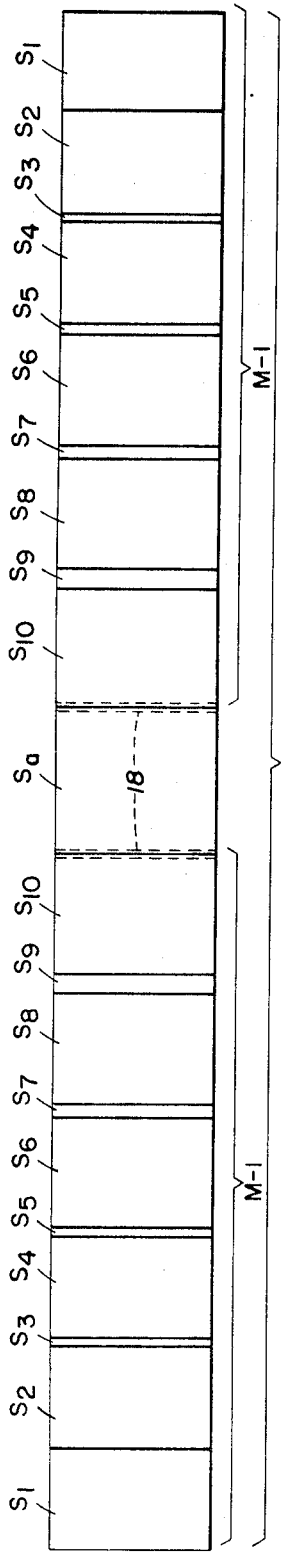
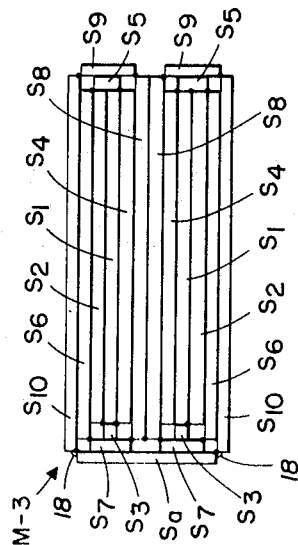
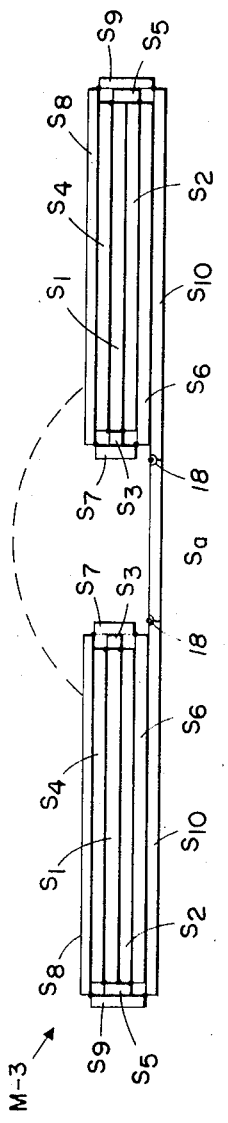
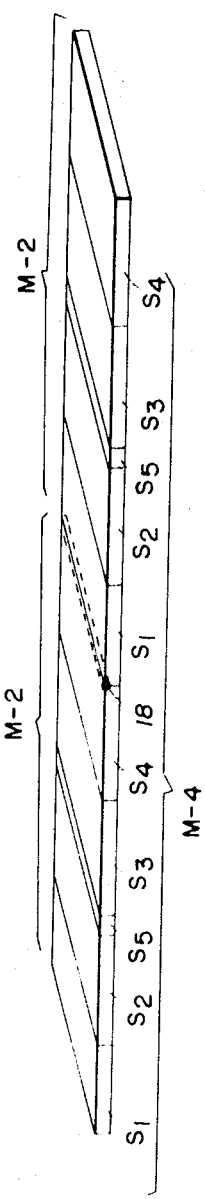
INVENTOR.
GEORGE P. NISSEN
BY
ATTORNEY Dec. 7, 1971  G. P. NISSEN  3,624,848
CONNECTABLE FLOOR MATS FOR GYMNASTIC AND ATHLETIC PURPOSES
Filed Jan. 23, 1969  6 Sheets-Sheet 5

INVENTOR.
GEORGE P. NISSEN
BY
ATTORNEY

Dec. 7, 1971   G. P. NISSEN   3,624,848
CONNECTABLE FLOOR MATS FOR GYMNASTIC AND ATHLETIC PURPOSES
Filed Jan. 23, 1969   6 Sheets-Sheet 6
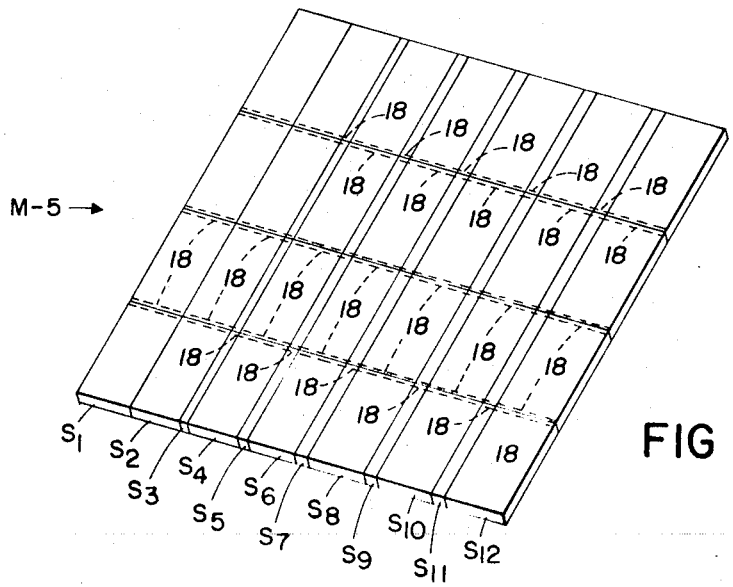
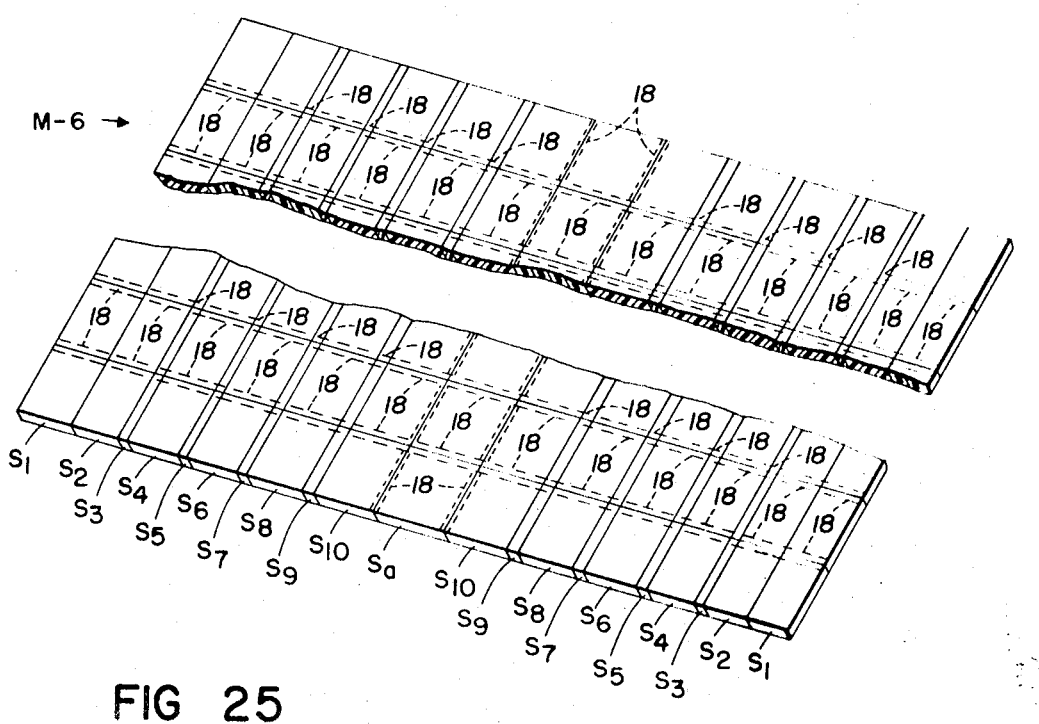
INVENTOR.
GEORGE P. NISSEN
BY
ATTORNEY

United States Patent Office 3,624,848
Patented Dec. 7, 1971

3,624,848
CONNECTABLE FLOOR MATS FOR GYMNASTIC AND ATHLETIC PURPOSES
George P. Nissen, Cedar Rapids, Iowa, assignor to Nissen Corporation, Cedar Rapids, Iowa
Filed Jan. 23, 1969, Ser. No. 793,353
Int. Cl. A47g 9/00
U.S. Cl. 5—344                26 Claims

ABSTRACT OF THE DISCLOSURE

Gymnastic and athletic floor mats are disclosed composed of a succession of abutting rectangular mat sections, each individual section consisting of shock absorbing filler material enclosed by flexible sheet covers and permanently jointed to its neighbor by the top covers only of the two. Two or more such mats, each having several such sections, may be quickly and easily removably connected together, both end-to-end and/or side-to-side, to form large expanses of relatively unbroken mat top surface. The latter is accomplished by joining the top covers only of the respective individual abutting sections of the component mats by removable slotted tubular connectors, generally C-shaped in cross section, which engage and embrace projections formed along the edges of the respective abutting top covers, the connectors being disposed between the abutting side walls of the respective connected mat sections. The connector between each pair of such sections is readily slipped on or off endwise thereof when one component mat is flopped over onto another.

The foregoing conectors are preferably employed in combination with one or more such component mats in which the lengths of the individual sections of each component mat are a function of their thickness such that each component mat can be "roll-folded" up into a single, compact stack for ready transport and storage without the need first to separate it into its individual sections or groups of sections. One or more such mats are then removably joined to each other, end-to-end and/or side-to-side, by the aforesaid connectors in order to permit a wide range of mat sizes and shapes to be assembled from a few basic "roll-foldable" mats. The removably joined mats can be "roll-folded" together as one mat as well as individually "roll-folded" when disconnected.

BACKGROUND OF THE INVENTION

Modern gymnastic and athletic mats are typically constructed of blocks of lightweight, shock absorbing foam filler material, such as a polyethylene foam, and encased in covers of nylon fabric or similar material. However, in order to provide a mat which can be readily transported and stored, since the foam blocks cannot be individually rolled or folded as can some of the older, heavier mats of hair felt or goat's hair, the practice has been to break the mat up into relatively short lengths of several sections each which are removably fastened to each other in various ways, such as that disclosed in U.S. Pat. 3,242,509 employing Velcro tape. But the Velcro, or other fastening means, as the case may be, usually connects only the bottom covers of the individual mat lengths so that necessarily a deep crevice is left between their abutting top covers. Even in the few instances where fastening means, such as zippers, connect only the abutting top covers, overlying flaps are used to cover the zipper. An "accordion" fold, as shown in U.S. Pat. 3,284,819, is not wholly satisfactory either because its alternate folds also leave deep crevices between every other pair of abutting top covers. The presence of deep openings or crevices in the mat top surface, or overlying flaps, is undesirable in many instances because such, no matter how apparently unobtrusive they appear, may interfere with or even injure a performer, as, for instance, should his fingers or toes be caught therein.

It is obviously desirable to have mats with a relatively unbroken surface which may be easily converted for transport and storage without need to break them up into their component sections, as well as to be able easily to removably join several such mats to form a larger mat expanse also having a relatively unbroken top surface and also converticle for transport and storage without need first to break it up into its component mats. The total necessary investment in mats and the required setup" time are both decreased if a relatively small number of component mats of the foregoing nature can be used either individually, such as for tumbling, or be joined end-to-end and/or side-to-side to form, for example, a large wrestling or free exercise mat having the same advantages and characteristics as the component mats. But hitherto this has not been achieved because, in the first place, substantial crevices are typically present between individual sections of each component mat and/or between adjoining component mats with all the faults the same entail, so that especially in the case of wrestling mats, a separate overall cover is usually required to cover the crevices. In the second place, the large such mat cannot be readily converted for transport or storage without first breaking it up into its component mats. This is especially burdensome when, as is often the practice, the component mats are tied or taped together to form the large mat and an overall cover is used.

Accordingly, the first and basic object of the present invention is the provision of means by which individual gymnastic mat sections, or two or more gymnastic mats made up of a number of such sections, may be quickly and easily removably joined to each other so as to provide a substantially unbroken mat top surface. The second object of the present invention is a combination of such means with two or more such mats, each of whose individual sections are permanently joined to each other to provide a substantially unbroken top surface and each of which may be readily converted for transport and storage without requiring it first to be broken up into its individual sections, so as to form a larger mat which also has a substantially unbroken top surface and which can also be transported and stored without need first to break it up into its component mats.

SUMMARY OF THE INVENTION

The foregoing objects and others are achieved, in the preferred forms of the invention, by forming each individual mat section with a fold or bight along the four edges of its top cover, each such bight overhanging its respective side wall. When two such sections are to be permanently joined to each other, one is flopped over on top of the other and the bights along the two side walls which are to abut each other are simply sewn together. Thus, when the first section is flopped back, the two are permanently secured to each other in a manner providing a substantially unbroken top surface. Any length of mat can be made up in this fashion from a number of such sections, all of which are joined in effect only by their respective top covers. When two or more such sections, or two or more mats, each composed of a number of such sections, are to be removably joined to form a larger mat, then the connectors of the present invention are employed. For this purpose, in one embodiment, the two bights along the abutting top edges of each pair of mat sections to be removably joined are formed with a length of cord therein. When one of the component sections or mats is flopped over on another, the two cord-filled bights of each respective pair of edges thus lie one atop the other and a connector, consisting of a tube of suitable material, such as a hard vinyl, slotted along its length, is slipped endwise over each such pair of bights, the latter being thereby encompassed and engaged by the interior of the tube with the edges of the tube's slot occupying substantially all of the portions of the bights between the cords and the adjacent mat side walls. When the first component section or mat is flopped back, the two are sightly secured together by the connectors which then lie hidden between their respective abutting mat side walls, the compressible mat fillers therebehind readily accommodating the connectors without impairing the mat. The cords in the bights prevent withdrawal of the latter from the connectors inasmuch as the width of the slot therein is approximately only that of the four thicknesses of the mat cover forming the two bights. The resulting joint is utterly secure and virtually indistinguishable from that achieved when the two bights are permanently sewn together as aforesaid, in both cases a substantially unbroken mat top surface being obtained. The connectors can be of sufficiently small overall diameter compared with the thickness of the mat sections so that, as a practical matter, they never bottom out" against the floor when the mat is compressed and so are almost wholly insensible to performers. To separate the sections or the larger mat into its components, the foregoing procedure is simply reversed and each connector can thereafter be stored on one of its bights.

In cases where the length of the connector is beyond two to three feet, the frictional drag on the interior of the connector by the cover material passing about the cords, such material being usually a vinyl impregnated nylon, may make the connectors relatively difficult to slide on and off. In these instances, a second embodiment of the invention may be advantageously employed. The bights, instead of being filled with lengths of cord, are fitted with small rivet-like projections, having semi-spherical metal heads and sometimes known as "spots," spaced along the lower overhanging faces of the two bights so that when one component section or mat is flopped over upon the other, the heads of the spots project in opposite directions, up and down, from each pair of bights. When the connector is slipped on, the heads of the spots provide relatively friction free surfaces for slidable engagement with the interior of the connectors. Certain other advantages of the spots are mentioned in the more detailed description of the invention which follows later herein.

As mentioned, the foregoing connectors are preferably combined with mats having individual sections forming a relatively unbroken top surface which can be readily transported or stored without being first broken up into their components. To accomplish this the lengths of the individual sections are adjusted so that, beginning at one or both ends of the mat, it may be successively "roll-folded" about the junctures between the individual sections into a neatly arranged stack of sections upon the floor which can then be readily carried away and stored. To accomplish this, each such mat is constructed of essentially two types of individual mat sections, "main" sections and "connecting" sections, the latter being disposed between certain main sections. Each section is also formed with an overhanging bight along the edges of its top cover and successive sections are permanently sewn to each other in the manner previously described so that a smooth mat top surface is provided. The lengths of the main and connecting sections depend both upon the length of the overall mat and hence the number of sections, as well as upon the thickness of each. The mat is literally "rolled up" and at the same time "folded" about the junctures between the main and connecting sections such that all the main sections lie one upon the other parallel to the floor while the connecting sections are disposed generally perpendicular to the floor at the ends of the main sections; hence the aptness of the term "roll-folded" or "roll-fold." In this manner, a mat of almost any overall length can be provided with a virtually unbroken mat top surface and yet readily be transported or stored.

Three particular embodiments of these "roll-fold" mats are disclosed herein. First, a longer mat in which successive main sections beginning with the third are progressively lengthened, the connecting sections being disposed between adjacent main sections beginning with the third and fourth, so that the mat can be roll-folded from one end. Second, a shorter mat having two pairs of two main sections of equal length between which is disposed a single connecting section such that the outer section of each pair may be folded on to its adjacent section and then one pair lifted up and stacked upon the other, the connecting section spanning the ends of the middle two of the stacked main sections. Third, a combination of the first and second types in which two mats of the first type are disposed with the outer ends of their longest main sections connected in the foregoing manner by their top covers only to the opposite ends of the top cover of an auxiliary connecting section therebetween. Thus each mat may be roll-folded toward the other and then one lifted up and stacked upon the other. The first type can be made to almost any length desired without the need of breaking it into disconnectable lengths; for instance, a mat approximately 20' in length has been found convenient for many gymnastic needs. The second type is most suitable for shorter mat lengths and reduces the required number of sections of differing individual lengths. A 12' to 16' mat can efficiently use that construction. The third type provides a very long mat and also reduces the number of sections of differing individual lengths which would otherwise be necessary were the same length of mat of the first type to be used. Furthermore, the third type decreases the effort and time required to roll or unroll the mat since both halves can be rolled or unrolled simultaneously toward or from the auxiliary connecting section. When connected together in this fashion, two 20' mats of the first type will give a total mat length of almost 42'.

At this point the connectors of the present invention may be employed. For instance, in the case of the third type of roll-fold mat just described, the auxiliary connecting section, instead of being permanently joined to the ends of the two mats of the first type, may be removably joined thereto by means of two conectors, thus increasing the flexibility of the mat because it is no longer necessary to have two or more mats of the first type and some of the third. The latter can be quickly made up from the former. Likewise, two or more mats of the second type can be removably joined end-to-end in the same manner, thus increasing their utility. Or a mat or the first type may be lengthened by removably joining additional roll-foldable mat sections thereto. Then the connectors can join several mats of the first type, or several of the second type, or several of the third type, as the case may be, side-by-side in order to provide a wide breadth of mat having a relatively unbroken top surface. For example, four mats of the first type, 6' wide and 24' in length, will make up a wrestling mat; seven mats of the third type 42' in length and 6' wide will make up a free exercise mat; in each case the resulting wide mat can also be roll-folded for transport and storage without the need to break it up into its components.

The present invention thus provides an easy means for removably joining gymnastic and athletic mats, or individual sections thereof, in a manner which produces a relatively unbroken mat top surface, and, in combination with mats of the roll-fold types, additionally permits wide, relatively unbroken breadths of mat surfaces to be made up therefrom, each of which is transportable and storable without the need first to dismantle it. Flexibility and utility of gymnastic and athletic mats, especially of the roll-foldable types, is accordingly greatly enhanced.

BRIEF DESCRIPTION OF THE DRAWINGS

FIG. 1 is a partial isometric view illustrating a pair of typical mat sections joined by a connector according to the present invention.

FIG. 2 is a vertical sectional view of a portion of a mat section of the nature illustrated in FIG. 1 showing in exploded fashion certain details of its construction.

FIG. 3 is a partial isometric view illustrating in exploded fashion one manner of securing the connector to the two mat sections illustrated in FIG. 1.

FIG. 4 is an enlarged isometric view of one of the connectors employed in the present invention.

FIG. 5 is an enlarged, vertical sectional detail illustrating how the abutting ends of the mat sections of FIG. 3 appear when unfolded.

FIG. 6 is a view taken along the line 6—6 of FIG. 5.

FIG. 18 is a top plan view showing two of the mats of FIG. 10 removably connected end-to-end to an intermediate auxiliary section so as to form one mat which may be roll-folded inwardly from each outer end.

FIGS. 19 and 20 are side elevational views illustrating successive steps in the roll-folding of the mat of FIG. 18.

FIG. 21 is an isometric view of two of the mats of FIG. 15 removably connected together end-to-end to form one mat which may be roll-folded inwardly from each end.

FIG. 23 is an isometric view of an assembly of mats, each similar to that of FIG. 10, removably joined side-to-side to form a wrestling mat.

FIG. 25 is a truncated, isometric view of an assembly of mats each similar to that of FIG. 18, removably joined side-to-side to form a free exercise mat.

With respect to all of the drawings generally, it should be pointed out that the proportions are somewhat distorted; for instance, the mat thickness illustrated is greater proportionally to the mat section lengths than is actually the case in order to render the drawings clearer than they would otherwise be.

DESCRIPTION OF THE PREFERRED EMBODIMENTS

Figure 11:
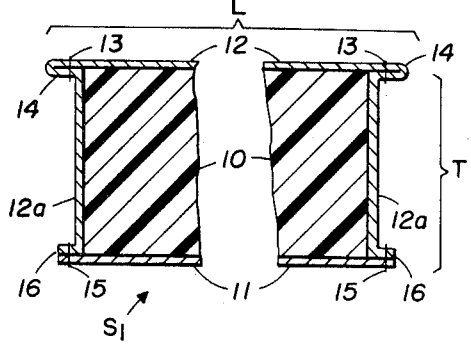
FIG. 11 is an enlarged, truncated vertical section taken along the line 11—11 of FIG. 10 illustrating the construction of each individual mat section thereof.

As mentioned, the basic structure of the individual mat sections is essentially identical regardless of their size or the means by which they are connected to their neighbors. Referring first to FIG. 1, the two sections A and B are preferably each constructed from several blocks or lengths of lightweight, shock absorbing foam, typically a polyethylene foam such as that sold under the trademark Ethafoam, placed in abutting side-by-side relation to form a rectangular mat filler 10 of the dimensions of the particular mat section involved. The filler 10 is then enclosed in an envelope formed from a bottom cover 11 and a top cover 12, both preferably of nylon cloth impregnated with a suitable resin. The top cover 12 is carried out over the upper four edges of the filler 10, reversed upon itself and stitched at 13 to form a short marginal extension or bight 14, and finally carried down to the bottom cover 11 to form side walls 12a, being stitched to the bottom cover 11 at 15 to form lap joints 16 (see FIGS. 6 and 11). The blocks of foam constituting the filler 10 may be secured to each other or to one or both of the covers 11 and 12 in any suitable manner, the important thing being that the mat top surface be smooth and unbroken. To this extent, the construction of each mat section is relatively conventional.

When two mat sections A and B of the foregoing nature are fashioned so as to be removably joinable to each other according to the first embodiment of the invention, a length of cord 17, preferably of nylon, is enclosed in each of the two bights 14 to form a pair of beads 14a along the two edges of sections A and B to be joined, each cord 17 terminating about one-half inch from the ends of its respective bight 14. Section B is then placed atop section A with their top covers 12 in face-to-face contact and their two beads 14a in vertical alignment with each other as shown in FIG. 3. A flexible, tubular connector 18, having a slot 19 therein throughout its length, is slipped endwise over the two beads 14a, also as indicated in FIG. 3, the termination of the cords 17 short of the ends of beads 14a aiding the application of the connector 18. The two sections A and B are then unfolded whereupon, as shown in FIG. 5, the beads 14a and the connector 18 assume a position wherein the latter is compressed between the resilient end walls 12a and the beads 14a are securely retained within the connector 18 by means of the lips 19a of the slot 19. The flexibility of the connector 18 in beam allows it to depress with the two mat sections so that its presence is not readily felt by a performer.

The relative dimensions of the beads 14a, connector 18, the width of its slot 19 and the thickness of sections A and B are fairly important. In the first place, the overall diameter of the connector 18 should not be too great or it may "bottom out" when the joint is depressed by a performer. The slot 19 should be narrow enough to retain a single bead 14a therein; otherwise, should the two beads 14a become laterally misaligned with respect to each other within the connectors 18 under some circumstances, one could slip over the other and be pulled out of the slot 19. Furthermore, if the slot 19 is narrow enough so that one bead 14a cannot be pulled therefrom, the connector 18 can be readily stored thereon when the sections A and B are separated. Next, since the tightness of the joint between the two beads 14a at the immediate level of the top cover 12 is a function of the width of slot 19, the latter should be as narrow as is feasible for this reason. Finally, the width of the lips 19a should be sufficient to occupy substantially the entire area of the bights 14 between the side walls 12a and the beads 14a in order that the latter not slip back and forth radially of the connector 18. The proper dimensions of the various components to accommodate these diverse demands can be readily determined by those skilled in the art. However, the following have proved satisfactory in use: In the case of mat sections of typical 1½" thickness, and covered with the customary vinyl impregnated nylon cloth, the cords 17 are about 3/32" in diameter, and the connectors 18 have an overall diameter of about .47", an interior diameter of about .28", giving a thickness of lips 19a of about .14", and a width of slot 19 of about .13".

As mentioned heretofore, when the connectors 18 exceed about 3' in length, it sometimes proves relatively difficult to apply and remove them. This is true for several reasons. First, the frictional drag of the material of the beads 14a upon the lips 19a, especially when the former is a vinyl impregnated nylon and there is some variation in the thickness of the four layers of material making up the two beads 14a, as is usually the case. Were no more than this involved, the foregoing would not sometimes be a problem, but it is combined with the even greater frictional drag of the interior of the connectors 18 upon the cover material forming the outer surface of the beads 14a. The latter drag can, of course, be alleviated by increasing the interior diameter of the connectors, but then the latter may no longer be small enough to be insensible to performers or may even "botton out" against the floor, at least when the mat thickness is no more than 1½" as is typical. Thus, where the connectors are longer than about 3' and/or must be relatively frequently applied and removed, the second embodiment of the invention will be more satisfactory.

Figure 7:
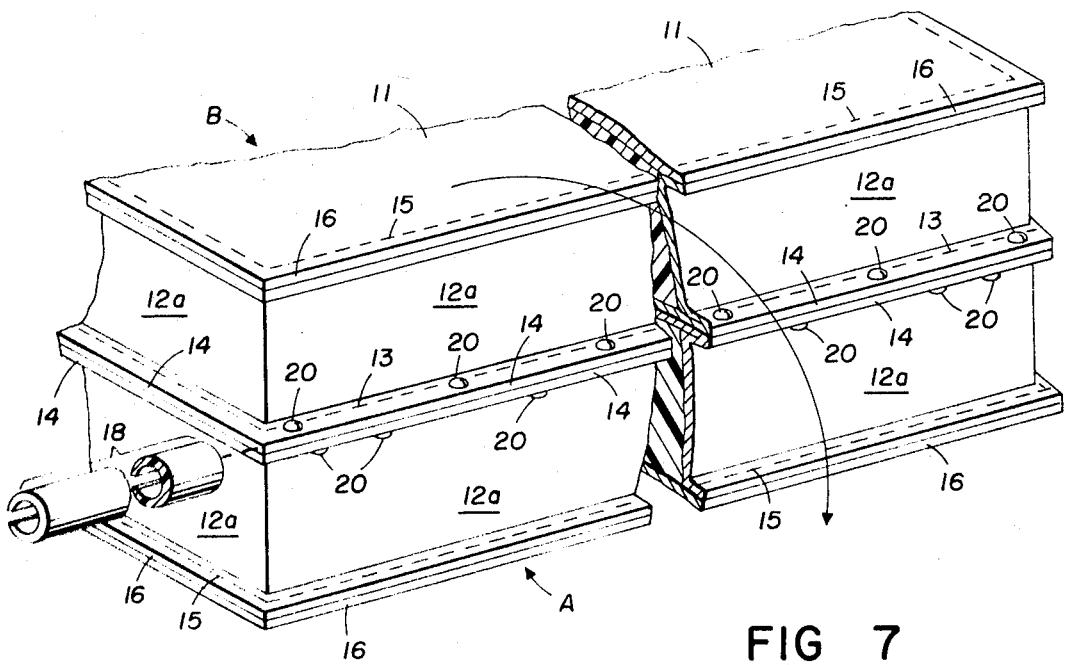
FIG. 7 is an enlarged truncated view, otherwise similar to FIG. 3, illustrating in exploded fashion another manner of securing the connector to the two mat sections shown in FIG. 1.
Figure 9:
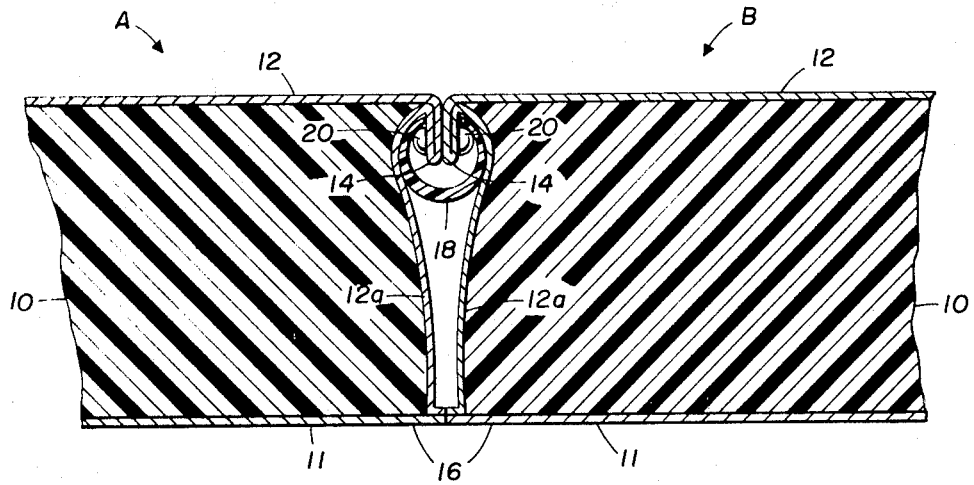
FIG. 9 is an enlarged, vertical sectional detail illustrating how the abutting ends of the mat sections of FIG. 7 appear when unfolded.
Figure 8:
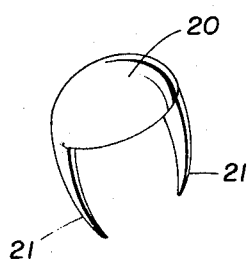
FIG. 8 is an enlarged isometric view of one of the "spots" employed in the construction in FIG. 7.

In that case, the cords 17 are omitted and instead the under faces of the two bights 14 along the edges of sections A and B to be joined (see FIG. 7) are equipped with small, rivet-like fittings 20 having rounded heads, popularly known as "spots" in the leather adornment field, one of which is illustrated in FIG. 8. The two pointed cleats 21 of the spots 20 are simply inserted through the bights 14 along their outer edges and bent over on the upper faces of the latter to secure them. Preferably, a pair of spots 20 are positioned nearly opposite each other at each end of the two bights 14, say about ¼" apart, while the remainder are spaced therealong in staggered relation so that there is approximately a ½" to 1" interval between a spot on one bight and the adjacent spot on the other bight, as shown in FIG. 7. Spots having a head diameter of ¼" have proved very satisfactory with connectors of the foregoing dimensions. The heads of the spots 20 thus provide a succession of discrete, relatively friction-free surfaces which slidably engage the interior of the connectors 18 and greatly ease their application and removal. In addition, the spacing of the spots 20 permits the connector 18 to be applied to the bights 14 intermediate the ends of the latter which also increases the ease of their application and removal. Were even smaller spots used, as can be done, the interior, and thus the exterior, diameter of the connectors could be reduced which would render them even more insensible to a performer. When the two sections A and B are unfolded, the connector 18, with the bights 14 and their spots 20 therewithin, assume the relative positions shown in FIG. 9.

While the connectors 18 have been disclosed in conjunction with gymnastic and athletic mats of the lightweight, foam filled, types, they can also be employed to removably connect individual mats filled with hair felt or goats hair simply by constructing the latter in the general manner heretofore described. However, owing to their much greater weight, it is really not practicable to construct the hair felt or goats hair filled mats so that they can also be roll-folded simply because the weight of several sections together would be prohibitive of ready transport and storage. Hence, the combination of the connectors 18 with mats of the roll-foldable nature next to be described is, as a practical matter, largely limited to those using light-weight foam fillers or the like.

Figure 12:
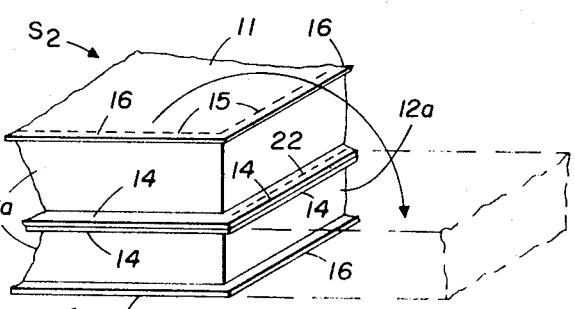
FIG. 12 is an enlarged, partial isometric view showing the manner of permanently connecting the individual sections of the mat of FIG. 10.
Figure 13:
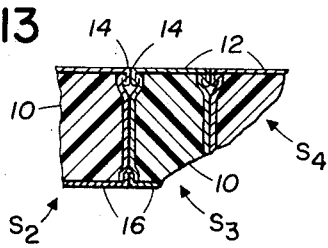
FIG. 13 is an enlarged, truncated vertical section taken along the line 13—13 of FIG. 10 illustrating how the permanently joined, abutting ends mat sections appear when the mat is unfolded.

When a mat M is made up so as to be roll-foldable, a number of successive, individual mat sections S of equal width W, each constructed in the same manner as mat sections A and B above described, are permanently joined together in abutting end-to-end relation as illustrated in FIG. 12. For this purpose, the first section $S_1$ is positioned with its top cover 12 uppermost. The adjoining section $S_2$ is also inverted thereon with its top cover 12 in face-to-face contact with that of $S_1$ and their respective ends to be joined disposed one above the other. The two bights 14 at each such end are then stitched together at 22 as close to the side walls 12a as feasible. The section $S_2$ is next swung about the stitching 22 as indicated in FIG. 12, whence the two bights 14 are sandwiched between the abutting side walls 12a, as shown in FIG. 13, the respective lap joints 16 assuming the same relation, as shown in the latter figure, or merely abutting or overlapping each other, it making no difference which. The adjoining top covers 12 of sections $S_1$ and $S_2$ thus present a substantially smooth top mat surface with essentially no gap or crevice therebetween.

Figure 10:
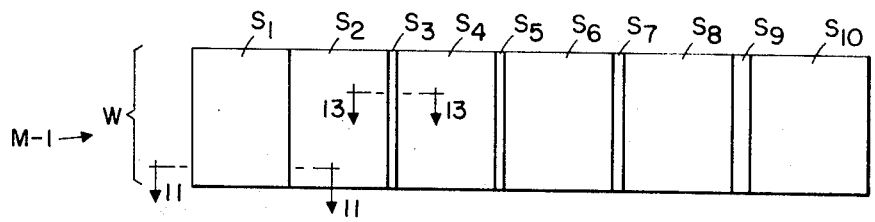
FIG. 10 is a top plan view of a mat employing ten individual mat sections of such lengths and permanently joined to each other in such manner that the entire mat may be roll-folded beginning at the left-hand end.
Figure 14:
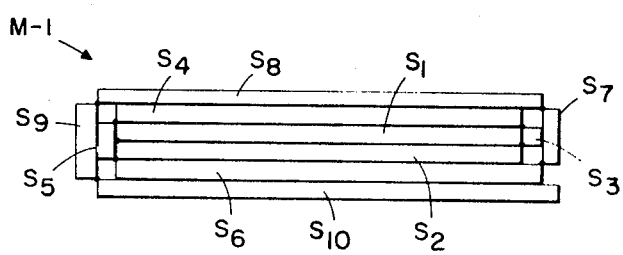
FIG. 14 is a side elevational view showing the mat of FIG. 10 after it has been roll-folded.

As an example, FIG. 10 illustrates a roll-fold mat M-1 employing 10 mat sections $S_1$-$S_{10}$, $S_1$, $S_2$, $S_4$, $S_6$, $S_8$, and $S_{10}$ being relatively long and denoted as "main sections," while $S_3$, $S_5$, $S_7$ and $S_9$ are relatively short and denoted as "connecting sections." The mat sections $S_1$-$S_{10}$ are arranged as shown in FIG. 10, the lengths of main sections $S_2$ and $S_4$ being each equal to the length of main section $S_1$, denoted by L. The lengths of main sections $S_6$, $S_8$ and $S_{10}$, however, progressively increase, depending upon the thickness, T, of the individual sections which of course is preferably uniform. The lengths of the connecting section $S_3$, $S_5$, $S_7$ and $S_9$ depend also upon the thickness T. In the case of the mat M-1, a comparison of FIGS. 10 and 14 will disclose that while the lengths of main sections $S_2$ and $S_4$ are each equal to that of $S_1$, or L, the lengths of main sections $S_6$, $S_8$ and $S_{10}$ are respectively $L+T$, $L+2T$, and $L+3T$, and the lengths of connecting sections $S_3$, $S_5$, $S_7$ and $S_9$, assuming the thicknesses of all the main sections are equal, are respectively T, 2T, 3T, and 4T. Hence, beginning with section $S_1$, the mat M-1 may be readily roll-folded into the stacked form shown in FIG. 14 wherein all the main sections overlie each other parallel to the floor with the connecting sections all disposed at the respective ends of the main sections but generally perpendicular to the floor.

A total of ten mat sections $S_1$-$S_{10}$ can easily provide a mat 20' in overall length and yet result when roll-folded into a convenient stack only about 3½' in length and 4' to 6' wide depending upon the width selected. For instance, if main sections $S_1$, $S_2$ and $S_4$ are each 3' in length and main sections $S_6$, $S_8$ and $S_{10}$ are respectively 3' 1½", 3' 3" and 3' 4½", the thickness of each section being 1½", and if accordingly connecting sections $S_3$, $S_5$, $S_7$ and $S_9$ are respectively 1½", 3", 4½" and 6", the result is a total overall mat length of 20'. This relationship provides the "tightest" or most compact possible stack when roll-folded, but it will be readily recognized that the mat could still be roll-folded if $S_2$, $S_4$, $S_6$, $S_8$ and $S_{10}$ were each greater than respectively L, $L+T$, $L+2T$, and $L+3T$, though a "looser," less compact stack would result and roll-folding would be more difficult. Also, of course, $S_{10}$ could be less than $L+3T$ in either case without affecting the roll-fold feature of the mat.

The foregoing relationships of the lengths of the main and connecting mat sections can be generalized and expressed in a form from which the lengths of the various sections can be determined for a mat of any number of sections greater than three all of the same thickness T, that is, a mat having sections $S_1 \ldots S_n$ where $S_n$ is always a main section. First, it will be noted that $S_3$, $S_5$, $S_7 \ldots S_{n-1}$ are always connecting sections and $n$ is an even integer greater than 3. Next, it will be noted that the length of the last connecting section is always $$\left(\frac{n}{2}-1\right) T \text{ or } \left(\frac{n-2}{2}\right) T$$

that the length of the next to the last main sections $S_{n-2}$ is always $$L+\left(\frac{n}{2}-3\right) T \text{ or } L+\left(\frac{n-6}{2}\right) T$$

Hence the lengths of the individual successive sections of a mat having a total of $S_n$ sections is L, L, T, L, 2T, $L+T$, 3T, $L+2T$, 4T, $L+T$, 5T $$L+4T \ldots L+\left(\frac{n-6}{2}\right) T, \left(\frac{n-2}{2}\right) T, L+\left(\frac{n-4}{2}\right) T$$

Figure 15:
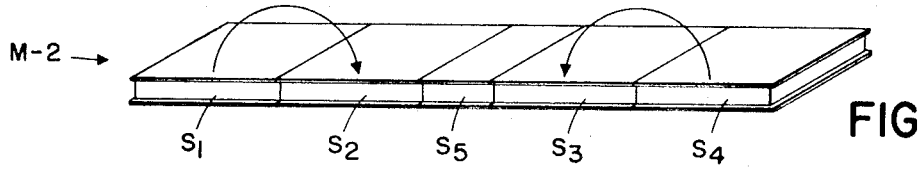
FIG. 15 is an isometric view illustrating a shorter form of roll-fold mat.
Figure 16:
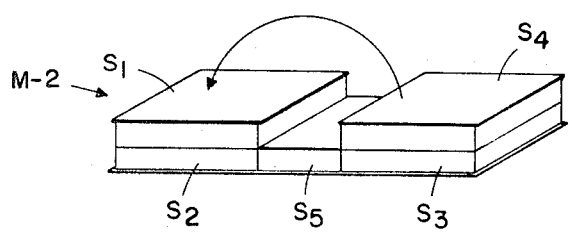
FIGS. 16 and 17 show successive positions of the mat of FIG. 15 during its roll-folding.
Figure 17:
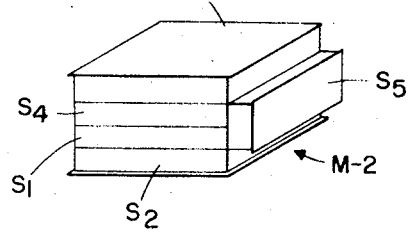

For shorter mat lengths the form of mat M-2 shown in FIGS. 15-17 may be used. There four main sections $S_1$, $S_2$, $S_3$ and $S_4$ and one connecting section $S_5$ are employed, $S_1$ being permanently joined to $S_2$ and $S_3$ to $S_4$ in the above described manner. $S_1$–$S_4$ are all equal in length, or at least the length of $S_2$ is greater than that of $S_1$ and the length of $S_3$ is greater than that of $S_4$. The connecting section $S_5$ is disposed between $S_2$ and $S_3$ and joined to each in the foregoing manner, the length of $S_5$ being equal to twice the thickness of each main section or, 2T. Hence, M–2 can be roll-folded from each end as illustrated and stacked as shown in FIGS. 15 and 17. If $S_1$–$S_4$ are 3' to 4' each in length the total length of M–2 will be approximately 12' to 16', a very convenient size for many gymnastic uses.

A combination of the principles of mats M–1 and M–2 is embodied in the mat M–3 illustrated in FIGS. 18–20. There the outer ends of the main sections $S_{10}$ of a pair of mats M–1 are disposed at the ends of an "auxiliary" connecting section $S_a$ and removably joined thereto in either of the above described manners by a pair of connectors 18. The length of $S_a$ is 10T, or 15" in the case of the specifis dimensions given above for M–1 where T is 1½". Of course, the two mats M–1 need not have the same number of sections or equal overall lengths because the arrangement of M–3 will work equally well with mats of unequal numbers of sections and/or in which the lengths of the respective sections $S_1$ are unequal. In the case of the foregoing generalized expressions where each mat M–1 has $S_1 \ldots S_n$ sections and L is the length of both main sections $S_1$, it will be noted that the length of $S_a$ must be twice the total number of main sections, less 2, times the thickness T. Or, stated another way, $S_a$ must span the combined thickness of the number of main sections, less 1, of each mat M–1. The number of main sections of each mat M–1 is equal to $$\frac{n}{2}+1$$

hence, in both mats, the number of main sections to be spanned is $$\left[\left(\frac{n}{2}+1\right)-1\right]+\left[\left(\frac{n}{2}+1\right)-1\right]$$

or $n$. Thus the length of $S_a$ is $nT$. If the two mats have unequal numbers of sections $n_1$ and $n_2$, as mentioned above, the length of $S_a$ will readily be seen to be $$\left(\frac{n_1+n_2}{2}\right)T$$

Each mat M–1 is then roll-foldable toward the auxiliary section $S_a$, providing two stacks of mat sections connected by $S_a$, one of which is then lifted up, inverted and placed upon the other as shown in FIGS. 19 and 20. Using the dimensions given above for each mat M–1, the combination will give an overall mat length of almost 42', yet when roll-folded will provide an easily handled stack approximately 3'7½" long and 4' to 6' wide depending upon the width employed. Hence, a number of basic, roll-fold mats M–1 can easily and quickly be removably joined one or more extended mats M–3 each of which in turn can also be roll-folded. Likewise, as shown in FIG. 21, a pair of mats M–2 may be removably joined by a connector 18 quickly to form an extended tumbling mat M–4 of 24' to 32', depending upon the length of each mat M–2, though the mat M–4 cannot be roll-folded until separated into its two components.

Figure 22:
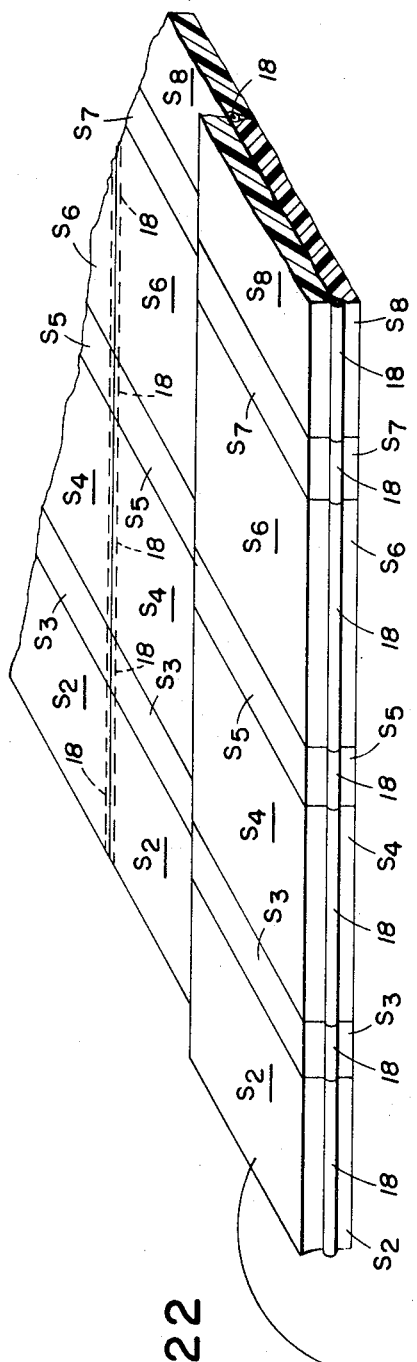
FIG. 22 is a partial isometric view illustrating the manner in which the connectors of the present invention are employed to removably join several of the mats of FIG. 10 side-to-side.
Figure 24:
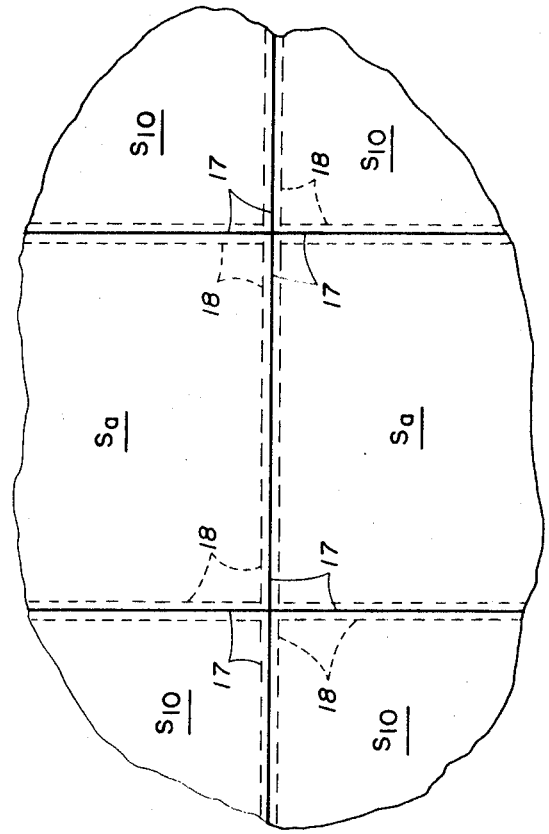
FIG. 24 is an enlarged, partial top plan view showing two of the mats of FIG. 18 removably joined together side-to-side.

Other advantages also accrue from the foregoing constructions. For instance, two or more identical mats M–1 may be placed side-by-side, instead of end-to-end, with their respective identical sections abutting each other, and removably joined by a series of connectors 18 between each pair of abutting mats M–1, as shown in FIG. 22, in order to provide a broad mat which can then be roll-folded in the manner described toward one end, whereupon the resulting stack of sections will lie off to one side of the floor. A particular example is the wrestling mat M–5 shown in FIG. 23 which employs four mats like mat M–1 but extended to a total of twelve sections, each 6' wide. Using the foregoing formula and the same lengths of sections $S_1$–$S_{10}$ given above in the case of a mat M–1 20' in overall length, will readily be seen that connecting section $S_{11}$ is 7½" and main section $S_{12}$ is 3'6", thus giving overall dimensions of mat M–5 of approximately 24' by 24'. The same is possible in the case of two or more identical mats M–3, as shown in FIG. 24, which will thus provide a very large overall mat which can then be roll-folded inwardly, beginning with the two rows of sections $S_1$, toward the row of auxiliary sections $S_a$, resulting in a very wide but short stack of mat sections in the middle of the floor. A particular example is the free exercise mat M–6 shown in FIG. 25 employing seven mats like mat M–3, each 6' wide and 42' long, joined side-to-side by connectors 18, to form a mat 42' by 42' overall. In either case, mats M–5 and M–6 when roll-folded can be transported without the need to break them up into their components. Even if an overall cover for the mats M–5 or M–6 should be employed, either mat can be roll-folded therewith, something which has hitherto not been possible where large mat areas have been made up from a number of small, interconnected lightweight mat sections or groups of sections; in those cases it has been necessary first to remove the cover before the mat can be dismantled for transport or storage.

While the present invention has been described in terms of specific embodiments, being the best modes known of carrying out the invention, and detailed descriptive language and specific dimensions have been used, the invention is not so limited. Instead, the following claims are to be read as encompassing all adaptations and modifications of the invention falling within the spirit and scope thereof.

I claim:

1. In a floor mat for gymnastic and athletic purposes having two or more adjoining rectangular mat portions, each of said mat portions including shock absorbing material and having a substantially continuous mat top surface, each pair of adjoining mat portions having side walls abutting each other in a plane transversely of said top surfaces, the improvement in combination therewith comprising: one or more connecting means removably connecting at least one pair of said mat portions together only along the abutting margins of their top surfaces to provide a substantially continuous mat top surface therebetween, each of said connecting means including a marginal extension of the top surface of each of said mat portions disposed along substantially the entire length of said abutting margins, said extensions being each downwardly directed and disposed between said abutting side walls in face-to-face relation to each other; retaining means disposed along each of said extensions and between said abutting mat side walls, each of said retaining means being spaced below the top plane of said mat portions and projecting transversely from its respective extension; and mat connecting means disposed between said abutting mat side walls below the top plane of said mat portions having opposed lip means removably engaging the areas of said extensions lying between said retaining means and the top plane of said mat portions, said lip means maintaining said extensions in face-to-face relation to each other and preventing withdrawal of said extensions and retaining means from between said lip means in a direction toward the top plane of said mat portions, said connecting means comprising one or several lengths disposed in end-to-end relation of tubular members, each of said members having an axially parallel slot therein throughout its length, the opposing side-walls of said slot forming said opposed lip means and disposed between the top plane of said mat portions and said retaining means, the interiors of said tubular members encompassing and engaging said retaining means, said tubular members being removable when one of said portions is disposed with its top surface in face-to-face engagement with the top surface of another of said mat portions by movement of said tubular members in a direction axially thereof toward one pair of the respective ends of said marginal extensions, said tubular members being compressed between said abutting side walls of said mat portions when said portions are disposed for use.

2. The floor mat of claim 1 wherein the width of said slot is less than the thickness of one of said extensions and said retaining means thereon.

3. The floor mat of claim 2 wherein each of said retaining means includes means forming, together with its respective marginal extension, an enlarged bead along substantially the entire outer lateral margin of each of said extensions, said beads laterally abutting each other and disposed substantially equal distances below the top plane of said mat portions.

4. The floor mat of claim 2 wherein said retaining means includes a plurality of discrete, protuberances spaced along the outer lateral margin of each of said extensions, and extending toward their respective abutting mat side walls, said protuberances along one of said extensions being in staggered relation to those along the other of said extensions, said heads of said protuberances providing reduced frictional engagement with the interior of said tubular members during slidable application and removal of said tubular members.

5. The floor mat of claim 1 wherein said improvement also includes in combination therewith: each of said mat portions comprising a longitudinally extending succession of discrete rectangular mat sections including three or more discrete main mat sections and one or more discrete connecting mat sections disposed between selected ones of said main sections, successive ones of said sections abutting each other end-to-end and permanently joined to each other at their top surfaces only to provide a substantially continuous top mat surface, the junctures between said sections being substantially all parallel to each other, whereby the top surface of each mat section may be folded upon the top surface of an adjacent section about the juncture therebetween, the length of each section being such that in a fully folded condition on the floor each of said mat portions comprises a stack of said sections in which all of said main sections are disposed in overlying relationship to each other on the floor with the planes of their top surfaces substantially parallel to the plane of the floor and in which all of said connecting sections are disposed adjacent at least some of the ends of said main sections with the planes of their surfaces lying transversely of the plane of the floor.

6. The floor mat of claim 5 wherein all of said mat portions have corresponding main and connecting mat sections of equal length and each of said portions is of uniform width, all of said mat portions being disposed in successive side-by-side relation with the side walls of the mat sections of each of said mat portions abutting the corresponding side walls of the mat sections of an adjacent mat portion, said connecting means removably connecting each laterally adjacent pair of said corresponding abutting mat sections to form a broadened mat surface.

7. The floor mat of claim 6 wherein the width of said slot is less than the thickness of one of said extensions and said retaining means thereon.

8. The floor mat of claim 7 wherein each of said retaining means includes means forming, together with its respective marginal extension, and enlarged bead along substantially the entire outer lateral margin of each of said extensions, said beads laterally abutting each other and disposed substantially equal distances below the top plane of said mat portions.

9. The floor mat of claim 7 wherein said retaining means includes a plurality of discrete, protuberances spaced along the outer lateral margin of each of said extensions, and extending toward their respective abutting mat side walls, said protuberances along one of said extensions being in staggered relation to those along the other of said extensions, said heads of said protuberances providing reduced frictional engagement with the interior of said tubular members during slidable application and removal of said tubular members.

10. The floor mat of claim 6 wherein each of said mat portions comprises $n$ mat sections $S_1 \ldots S_n$ of uniform thickness in which $S_3, S_5, S_7 \ldots S_{n-1}$ are connecting sections and the remainder $S_1, S_2, S_4, S_6, S_8, S_{10} \ldots S_n$ are main sections, the lengths of said connecting sections being respectively $$T, 2T, 3T \ldots \left(\frac{n-2}{2}\right)T$$

and the lengths of said main sections $S_2, S_4, S_6, S_8, S_{10} \ldots S_{n-2}$ being respectively at least $L, L, (L+T), (L+2T)$, $$(L+3T) \ldots \left[L+\left(\frac{n-6}{2}\right)T\right]$$

where $n$ is an even integer greater than 3, L is the length of $S_1$ and T is the thickness of said mat sections, said portions together defining a mat group.

11. The floor mat of claim 10 wherein the length of said main sections $S_2, S_4, S_6, S_8, S_{10} \ldots S_n$ of each of said mat groups is $L, L, (L+T), (L+2T)$, $$(L+3T) \ldots L+\left(\frac{n-4}{2}\right)T$$

12. The floor mat of claim 11 including a pair of said mat groups and an auxiliary connecting mat section disposed between the outer ends of each of the respective mat sections $S_n$ of said mat groups to form a broadened and elongated mat surface, the outer end side walls of said mat sections $S_n$ abutting the respective adjacent end side walls of said auxiliary connecting sections and the adjacent lateral side walls of successive auxiliary connecting sections abutting each other, each of said auxiliary connecting sections being joined to its respective pair of mat sections $S_n$ at their top surfaces only, said connecting means removably connecting laterally adjacent pairs of abutting auxiliary connecting sections, the length of each of said auxiliary connecting sections being $nT$.

13. The floor mat of claim 12 wherein the width of said slot is less than the thickness of one of said extensions and said retaining means thereon.

14. The floor mat of claim 13 wherein each of said retaining means includes means forming, together with its respective marginal extension, an enlarged bead along substantially the entire outer lateral margin of each of said extensions, said beads laterally abutting each other and disposed substantially equal distances below the top plane of said mat portions.

15. The floor mat of claim 13 wherein said retaining means includes a plurality of discrete, protuberances spaced along the outer lateral margin of each of said extensions, and extending toward their respective abutting mat side walls, said protuberances along one of said extensions being in staggered relation to those along the other of said extensions, said heads of said protuberances providing reduced frictional engagement with the interior of said tubular members during slidable application and removal of said tubular members.

16. The floor mat of claim 12 wherein each of said auxiliary connecting sections is removably connected to at least one of its two abutting mat sections $S_n$ by said connecting means.

17. The floor mat of claim 5 wherein all of said mat portions are disposed in successive end-to-end relation, the side wall of an end of one of said portions abutting the side wall of an end of another of said portions, said connecting means removably connecting each adjacent pair of said portions to form an elongated mat surface.

18. The floor mat of claim 17 wherein each of said mat portions comprises a total of five mat sections of uniform thickness including main sections 1, 2, 3 and 4 and a single connecting section 5, said connecting section being disposed between main sections 2 and 3, the lengths of said main sections 1 and 4 being not greater than respectively the lengths of said main sections 2 and 3, and the length of said intermediate section 5 being twice the thickness of said mat sections.

19. The floor mat of claim 18 wherein said main sections 1, 2, 3 and 4 are of equal length.

20. The floor mat of claim 19 wherein the width of said slot is less than the thickness of one of said extensions and said retaining means thereon.

21. The floor mat of claim 20 wherein each of said retaining means includes means forming, together with its respectively marginal extension, an enlarged bead along substantially the entire outer lateral margin of each of said extensions, said beads laterally abutting each other and disposed substantially equal distances below the top plane of said mat portions.

22. The floor mat of claim 20 wherein said retaining means includes a plurality of discrete, protuberances spaced along the outer lateral margin of each of said extensions, and extending toward their respective abutting mat side walls, said protuberances along one of said extensions being in staggered relation to those along the other of said extensions, said heads of said protuberances providing reduced frictional engagement with the interior of said tubular members during slidable application and removal of said tubular members.

23. The floor mat of claim 5 including a pair of said mat portions of uniform thickness, each of said mat portions comprising $n$ mat sections $S_1 \ldots S_n$ in which $S_3$, $S_5$, $S_7 \ldots S_{n-1}$ are connecting sections and the remainder $S_1, S_2, S_4, S_6, S_8, S_{10} \ldots S_n$ are main sections, the lengths of said connecting sections being respectively $$T, 2T, 3T \ldots \left(\frac{n-2}{2}\right)T$$

and the lengths of said main sections $S_2, S_4, S_6, S_8, S_{10} \ldots S_n$ being respectively at least $L, L, (L+T), (L+2T)$ $$(L+3T) \ldots \left[L+\left(\frac{n-4}{2}\right)T\right]$$

where $n$ is an even integer greater than 3, L is the length of $S_1$ and T is the thickness of said mat sections, and including an auxiliary connecting mat section disposed between the outer ends of respective the two main sections $S_n$ of said mat portions to form an elongated mat surface, the outer end side walls of said mat sections $S_n$ abutting their respective adjacent end side walls of said auxiliary connecting section, a pair of said connecting means removably connecting the respective adjacent ends of said auxiliary connecting section and the two mat sections $S_n$, the length of said auxiliary connecting section being $nT$.

24. The floor mat of claim 23 wherein the width of said slot is less than the thickness of one of said extensions and said retaining means thereon.

25. The floor mat of claim 24 wherein each of said retaining means includes means forming, together with its respective marginal extension, an enlarged bead along substantially the entire outer lateral margin of each of said extensions, said beads laterally abutting each other and disposed substantially equal distances below the top plane of said mat portions.

26. The floor mat of claim 24 wherein said retaining means includes a plurality of discrete, protuberances spaced along the outer lateral margin of each of said extensions, and extending toward their respective abutting mat side walls, said protuberances along one of said extensions being in staggered relation to those along the other of said extensions, said heads of said protuberances providing reduced frictional engagement with the interior of said tubular members during slidable application and removal of said tubular members.

References Cited

UNITED STATES PATENTS

| | | | |
|---|---|---|---|
| 1,061,906 | 5/1913 | Foreman | 206—45.11 |
| 1,515,711 | 11/1924 | Van Hove | 5—194 X |
| 1,612,052 | 12/1926 | Quisling | 5—197 X |
| 3,360,806 | 1/1968 | Dunaway | 5—344 |
| 2,653,852 | 9/1953 | Bissman | 312—341 NR |
| 2,589,579 | 3/1952 | Slayen | 5—357 |
| 2,034,060 | 3/1936 | Shapiro | 24—207 |
| 1,785,252 | 12/1930 | Frank | 5—357 |
| 807,579 | 12/1905 | Rogers | 24—207 |

BOBBY R. GAY, Primary Examiner

P. A. ASCHENCRENNER, Assistant Examiner

U.S. Cl. X.R.

5—357

UNITED STATES PATENT OFFICE
CERTIFICATE OF CORRECTION

Patent No. 3,624,848            Dated December 7, 1971

Inventor(s) George P. Nissen

It is certified that error appears in the above-identified patent and that said Letters Patent are hereby corrected as shown below:

Column 8, line 70, "$L + T$, $3T$, $L + 2T$, $4T$, $L + T$, $5T$"

should read --$L + T$, $3T$, $L + 2T$, $4T$, $L + 3T$, $5T$--.

Signed and sealed this 1st day of August 1972.

(SEAL)
Attest:

EDWARD M. FLETCHER, JR.           ROBERT GOTTSCHALK
Attesting Officer                 Commissioner of Patents